Dec. 30, 1958 J. S. BRENNAN 2,866,669
SHORT LIFE BEARING
Filed Jan. 4, 1957

INVENTOR.
Joseph S. Brennan
BY
ATTORNEYS

United States Patent Office 2,866,669
Patented Dec. 30, 1958

2,866,669

SHORT LIFE BEARING

Joseph S. Brennan, Amityville, N. Y., assignor to Fairchild Engine and Airplane Corporation, Bay Shore, N. Y., a corporation of Maryland Application January 4, 1957, Serial No. 632,535

7 Claims. (Cl. 308—77)

This invention relates to a novel type of bearing for a high speed rotating shaft.

In certain high speed apparatus, the life of the bearings is of comparatively short duration. This is particularly true of carbon bearings which are frequently used in cases where extremely high temperatures are encountered and petroleum lubricants would be impractical. The life of carbon bearings used under conditions of high temperature and high speed can be appreciably prolonged by the provision of means to dissipate the heat therefrom, such as by the addition of heat dissipating fins. The problem of equipping carbon bearings with heat dissipating fins, however, is one that is not easily solved without materially increasing the cost of the bearing. For example, an integral assembly of a carbon bearing having heat dissipating fins imbedded in the outer periphery thereof would substantially add to the cost of the bearing since the entire assembly would have to be discarded and replaced when the bearing becomes worn. Thus, the additional cost counteracts to some extent the advantages in prolonged life that are gained thereby. In addition, imbedding fins in the outer surface of a carbon bearing is impractical because it appreciably weakens the bearing along the plane of the fin. On the other hand, to increase the size of the carbon bearing in order to increase the strength thereof further adds to the cost of the bearing and, moreover, makes it more difficult to effectively dissipate the heat from the bearing.

It is the object of this invention to provide a novel, readily replaceable, short life bearing from which the heat may be efficiently dissipated by fins without weakening the bearing or without materially adding to the cost thereof.

For a complete description of the present invention, reference may be made to the detailed description which follows and to the accompanying drawings in which.

Figure 1:
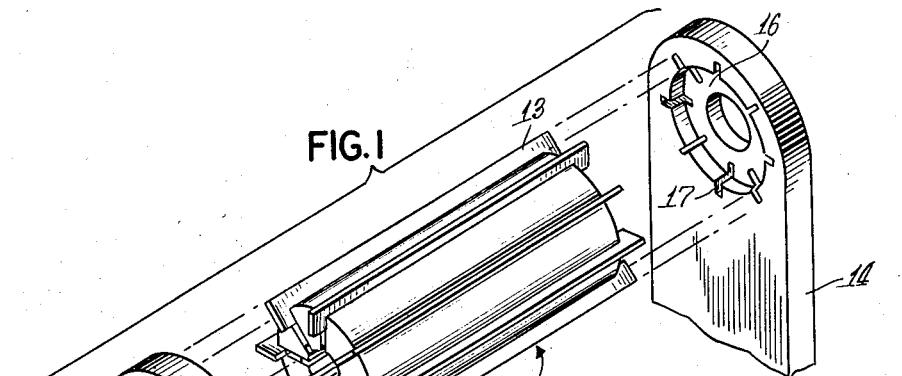
Figure 1 is a perspective exploded view of one embodiment of the bearing assembly of the present invention.
Figure 2:
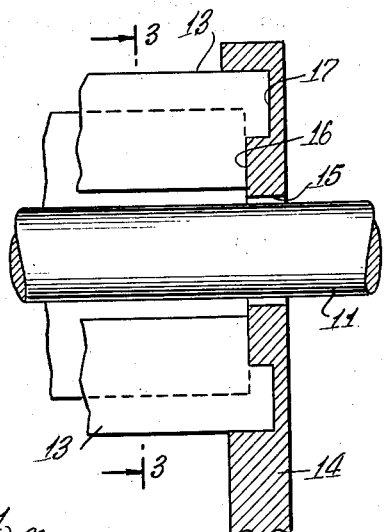
Figure 2 is a fragmentary elevational view, partly in cross-section, showing one end of the bearing assembly and the mounting therefor.
Figure 3:
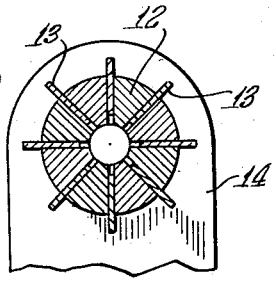
Figure 3 is a cross-sectional view taken along the line 3—3 of Figure 2, looking in the direction of the arrows.

Referring to the embodiment illustrated in Figures 1 to 3 of the drawings, the bearing assembly of the present invention, generally designated 10, for the high speed rotating shaft 11 comprises a plurality of individual longitudinal carbon bearing elements 12 arranged in a circular array about the shaft which are spaced apart from each other by radially disposed, longitudinal, heat dissipating aluminum fins 13. The bearing assembly is held together at opposite ends by a pair of upstanding supporting frames 14. The rotating shaft 11 extends through one or both of the circular openings 15 formed within the supporting frames 14, but there is adequate clearance therein for the shaft.

Referring particularly to Figure 3, the longitudinal carbon bearing elements 12 are of segmental configuration when viewed in cross-section with the inner bearing edges thereof curved in concave fashion complementary to the outer periphery of the rotating shaft. Adjacent bearing elements are separated by a radial fin, and opposite sides of the inner portion of each of the fins 13 are in face-to-face contact with the oppositely disposed surfaces of the adjacent bearing elements. The outer portion of the fin, of course, extends substantially beyond the outer periphery of the bearing elements 12 so as to readily dissipate the heat from the bearing elements to the atmosphere or other heat sink.

The entire bearing assembly comprising the circular array of longitudinal bearing elements and longitudinal radial fins disposed between the bearing elements is held together at opposite ends by the frame members 14. Accordingly, a circular recess 16 is formed in each of the oppositely disposed faces of the supporting frames to receive the ends of the bearing elements, and individual slots 17 are also formed therein to receive the extreme ends of the fins therein. The radial slots 17 are formed more deeply in the face of each of the frames 14 than is the circular recess 16 so as to provide independent support for the fins to insure that they are held out of contact with the shaft. Furthermore, the slots 17 each extend radially beyond the outer circumference of the circular recess 16 since, of course, the fins extend beyond the outer periphery of the bearing elements.

Preferably one or both of the frame members 14 are mounted for movement toward and away from each other to facilitate the assembly and disassembly of the bearing components. More particularly, with the supporting frames 14 moved apart, the bearing elements may be readily removed and new bearing elements replaced. The fins may also be replaced, if desired, but since they are not subject to wear, the fins will not normally need to be replaced unless damaged. When new bearing elements have been substituted, the frames may be moved together to anchor or hold the bearing components together at opposite ends thereof as a unitary assembly. Other suitable means may be employed to hold the bearing components together. For example, circular spring clips may be affixed at each end of the bearing assembly, in which case the fins may be cut away or slotted to accommodate the clips, or the fins may be shortened to a length less than the length of the bearing elements 12.

Figure 5:
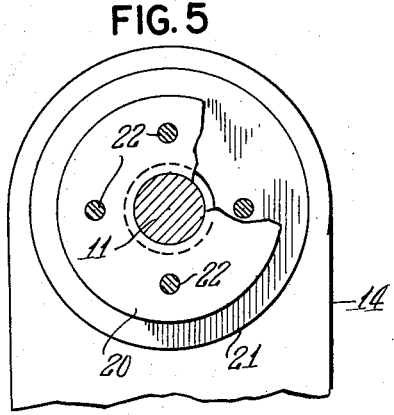
Figure 5 is a cross-sectional view taken along the line 5—5 of Figure 4, looking in the direction of the arrows.
Figure 4:
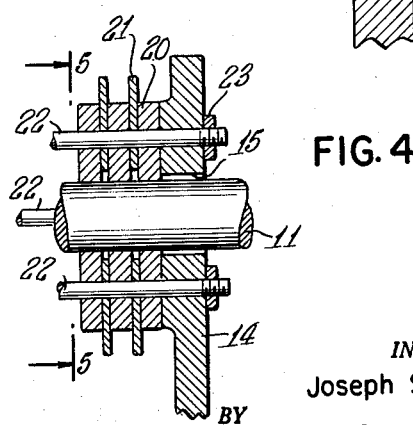
Figure 4 is a fragmentary, cross-sectional, elevational view showing one end of an alternative embodiment of the bearing.

Another embodiment of the present invention is shown in Figures 4 and 5. In this case the carbon bearing elements comprise a plurality of planar disks 20 in stacked array which are separated by disk-like aluminum fins 21. The latter, of course, are of greater diameter than the bearing elements so as to dissipate heat to the atmosphere. The entire series or stack of bearing disks and heat dissipating disks are disposed perpendicular to the axis of the shaft, and they are held together side by side in frictional contact with each other between the supporting frames 14 by the axially extending rods 22, thus forming a unitary bearing assembly.

The array or stack of disks 20 and 21 contain aligned central openings therein to receive the shaft 11 which passes therethrough. The openings are, of course, aligned with the holes 15 in the supporting frames 14. The openings of the disks 21 are enlarged to provide clearance for the rotating shaft without unnecessarily reducing the heat exchange area between the disks 20 and 21. The edges defining the aligned openings in the disks 20, however, serve as the bearing surfaces for the shaft.

The disks 20 and 21 also are provided with a plurality of aligned openings through which the tie rods 22 extend. The tie rods 22 are threaded on at least one end to receive a nut 23 outboard of the supporting frame 13, and by mounting one or both of the supporting frames 14 for movement toward and away from each other the disks may be held tightly together by tightening the nuts 23.

From the foregoing description, it is apparent that the present invention provides an effective carbon bearing for a rotating shaft which is readily replaceable when worn out, while at the same time providing for a very efficient and effective means for dissipating the heat therefrom.

The present invention has been shown in preferred forms only and by way of example, and obviously many modifications and variations may be made therein without departng from the spirit of the invention. The invention, therefore, should not be limited to any form or embodiment, except in so far as such limitations are set forth in the appended claims.

I claim:

1. A bearing comprising a pair of spaced apart supporting frames, a plurality of spacially separated bearing elements which cooperate to support a rotating shaft, a plurality of cooling fins for dissipating heat from said bearing elements to a surrounding fluid, the inner portions of each of said cooling fins being in heat exchange relationship with surfaces of adjacent bearing elements so as to receive heat therefrom, the outer portions of said cooling fins extending radially beyond the bearing elements, thereby exposing substantial areas thereof to the surrounding fluid to dissipate the heat to the surrounding fluid, the outer ends of said bearing elements and said cooling fins being free of contact with the supporting frames or any enclosure for the bearing throughout a major portion of the length of the bearing and means for holding said individual bearing elements and fins together and to the supporting frames to form a unitary bearing assembly.

2. A bearing for a rotating shaft as set forth in claim 1 wherein the bearing elements and the fins extend longitudinally in a direction substantially parallel to the axis of the rotating shaft and wherein the individual bearing elements are held together in a circular array around the rotating shaft.

3. A bearing for a rotating shaft as set forth in claim 1 wherein the bearing elements and the cooling fins are in the form of a plurality of disks, alternate of said disks being bearing elements and alternate of said disks being cooling fins.

4. A replaceable bearing for a rotating shaft comprising a plurality of spacially separated bearing segments arranged in circular array and which cooperate to support a rotating shaft, a bearing surface formed in each of said bearing segments, which surface is complementary to and in contact with the outer periphery of the shaft, a plurality of cooling fins separating said bearing segments, the inner portion of each of said cooling fins being in face-to-face heat exchange contact with oppositely disposed surfaces of adjacent bearing segments and the outer portion of each of said cooling fins emanating outwardly from the axis of the rotating shaft substantially beyond the outer surfaces of the bearing segments to dissipate heat therefrom to a surrounding fluid, the outer ends of said bearing elements and said cooling fins being free of contact with any enclosure throughout a major portion of the length of the bearing, and means for anchoring said individual bearing segments together to form a bearing assembly.

5. A bearing for a rotating shaft comprising a plurality of longitudinal carbon bearing elements spacially separated from each other and arranged in a circular array, a plurality of radially disposed cooling fins interposed between opposite faces of adjacent bearing elements and extending outwardly of said bearing elements to dissipate heat from the bearing elements to a surrounding fluid, the outer ends of said carbon bearing elements and said cooling fins being free of contact with any surrounding enclosure throughout a major portion of the length of the bearing, and means for anchoring said circular array of bearing elements and said cooling fins together to form a unitary bearing assembly.

6. A bearing for a rotating shaft comprising a plurality of longitudinal carbon bearing elements spacially separated from each other and arranged in a circular array, a plurality of radially disposed cooling fins interposed between opposite faces of adjacent bearing elements and extending outwardly of said bearing elements to dissipate heat from the bearing elements to the surrounding fluid, and means for anchoring said circular array of bearing elements and said cooling fins together to form a unitary bearing assembly, said means for anchoring the circular array of bearing elements and cooling fins together to form a bearing assembly including a pair of supporting frames, one engageable with each end of the bearing assembly, and recessed means carried by each of the supporting frames for receiving the ends of the bearing elements and the cooling fins to hold them in the desired relationship with each other.

7. A bearing for a rotating shaft comprising a plurality of spacially separated disk-like bearing elements having aligned openings therein to receive the rotating shaft, the edges of said disks defining the aligned openings serving as bearing surfaces for the shaft, a plurality of disk-like radially disposed cooling fins interposed between and in heat exchange contact with said bearing elements, the inner periphery of each of said cooling fins being in face-to-face contact with the oppositely disposed surfaces of adjacent bearing elements and the outer periphery thereof extending outwardly from the axis of the rotating shaft substantially beyond the outer peripheries of the bearing elements to dissipate heat from the bearing elements to a surrounding fluid, a pair of supporting frames at each end of the bearing assembly, aligned holes extending through the stack of disks, and tie rods extending through said aligned holes between the supporting frames for supporting said stack-like array of disks to form a unitary bearing assembly, the arrangement being such that the outer ends of the bearing elements and the cooling fins are free of contact with the supporting frames or any surrounding enclosure throughout a major portion of the length of the bearing assembly.

References Cited in the file of this patent

FOREIGN PATENTS 284,654     Great Britain _____ Aug. 23, 1928